United States Patent [19]

Oestreicher et al.

[11] Patent Number: 5,769,052
[45] Date of Patent: Jun. 23, 1998

[54] METHOD FOR REGULATING LOADING AND ACCELERATION BEHAVIOR OF SUPERCHARGED INTERNAL COMBUSTION ENGINES

[75] Inventors: Wolfgang Oestreicher, Friedrichshafen; Hans Zellbeck, Lindau, both of Germany

[73] Assignee: MTU Motoren-und Turbinen-Union Friedrichshafen GmbH, Friedrichshafen, Germany

[21] Appl. No.: 700,412
[22] PCT Filed: Dec. 21, 1995
[86] PCT No.: PCT/EP95/05081
§ 371 Date: Aug. 23, 1996
§ 102(e) Date: Aug. 23, 1996
[87] PCT Pub. No.: WO96/20337
PCT Pub. Date: Jul. 4, 1996

[30] Foreign Application Priority Data

Dec. 23, 1994 [DE] Germany .......................... 44 46 246.8

[51] Int. Cl.[6] .......................................................... F02D 7/00
[52] U.S. Cl. ........................................... 123/383; 123/501
[58] Field of Search .................................. 123/383, 500, 123/501, 502

[56] References Cited

U.S. PATENT DOCUMENTS

| | | |
|---|---|---|
| 3,673,796 | 7/1972 | Weick et al. . |
| 4,397,285 | 8/1983 | O'Neill . |
| 4,426,982 | 1/1984 | Lehner et al. ........................... 123/501 |
| 4,469,066 | 9/1984 | Yuzawa ................................... 123/383 |
| 4,538,581 | 9/1985 | Hakansson .............................. 123/502 |
| 4,709,676 | 12/1987 | Monaghan .............................. 123/383 |
| 4,720,977 | 1/1988 | Giesen et al. . |

FOREIGN PATENT DOCUMENTS

| | | |
|---|---|---|
| 2 500 065 | 8/1982 | France . |
| 35 46 054 | 7/1986 | Germany . |
| 41 13 958 | 11/1992 | Germany . |
| 1 460 632 | 1/1977 | United Kingdom . |

Primary Examiner—Thomas N. Moulis
Attorney, Agent, or Firm—Evenson, McKeown, Edwards & Lenahan, P.L.L.C.

[57] ABSTRACT

A method is provided for improving the loading behavior of an internal combustion engine that is supercharged by an exhaust turbocharger and is operated in an essentially steady-state mode, in which system-related sags in rpm when a load is applied the entire performance potential of the motor can be exploited by a temporary cutting in of a dynamic load- and motor-operation-adjusted variable regulation of the beginning of delivery. By regulating the beginning of delivery, the indicated average pressure is increased while exhausting the stated mechanical load limits, while the boost pressure buildup, which otherwise is delayed disadvantageously and is necessarily produced in Diesel engines supercharged with exhaust turbochargers by the limited acceleration capability of the turbocharger, can be used to increase performance by influencing the combustion process, said influence being regulated by the beginning of delivery.

9 Claims, 3 Drawing Sheets

METHOD FOR REGULATING LOADING AND ACCELERATION BEHAVIOR OF SUPERCHARGED INTERNAL COMBUSTION ENGINES

BACKGROUND AND SUMMARY OF THE INVENTION

The invention relates to a method for improving the loading behavior of an internal combustion engine with one or more turbochargers and, more particularly, to a method for regulating the loading behavior of an internal combustion engine with one or more turbochargers, especially a Diesel engine with exhaust turbocharging as a drive for an electrical generator, in which the internal combustion engine is operated by supplying fuel as a function of at least one operating parameter, mainly in optimized steady-state operating states, corresponding to the motor requirements in each case.

In steady-state operation of an internal combustion engine with exhaust turbochargers, the torque delivered by the internal combustion engine is determined not only by the internal efficiency of the internal combustion engine, but also dependent on the interplay between the cylinders and the exhaust turbochargers. Thus, a supercharged internal combustion engine, hereinafter also referred to as the motor, at a transition from a steady-state load stage to a different, higher steady-state load stage, i.e. during so-called transient operation, does not reach the load stage to be compensated until after a definite warmup time has elapsed. This period of time until the set load stage is reached is determined primarily by the acceleration capacity of the turbocharger. As a result, when a large load is applied during this warmup time, the desired engine performance is not reached immediately. Especially each time a load is applied and each time the motor is accelerated, this means that, initially and momentarily, the performance values which are reached are lower than the performance points that can be achieved only after a significant delay, and which are required to compensate the new steady-state operating point.

In addition, the degree of deviation of the power that is initially available from the steady-state set load stage depends on the starting point of the respective acceleration, so that considerable deviations can occur in low rpm ranges under load.

The reason for this is that upon acceleration from an operating point with a low rpm and low torque, the boost air pressure, and hence the volume of air available for combustion in the cylinder, is insufficient to react with the amount of fuel required to represent the load stage or operating point.

In addition to the limited acceleration capacity of the turbocharger, the acceleration capacity of the motor is also determined by its performance potential, utilizing the predetermined mechanical and thermal load limits. The mechanical loadability is critically determined by the maximum combustion pressure, which in turn is significantly influenced by the boost air pressure at the cylinder. The maximum admissible internal cylinder pressure is therefore the limit for the maximum acceleration capacity of the internal combustion engine that can be obtained when necessary. If the internal combustion engine is subjected to demands above this over-pressure limit and for longer than a predetermined period of time, damage to the motor can result. Consequently, an arbitrary increase in motor power for load compensation is also impossible because of the motor-loading limit.

Because of this risk of overloading the internal combustion engine, the parameters referred to above are important, especially for operating a supercharged Diesel engine as a drive in generator systems. The generator load connection is characteristic of the operating requirements of such a drive for a motor-generator set in which the motor, for example, must be shifted to full load from idle within the shortest possible time. Another factor that complicates the situation is that the entire generator system must keep the motor output rpm largely constant during all motor regulating states, so that the electrical power delivered by the generator can be fed into the network as close to the rated frequency as possible. It is this latter requirement in particular that cannot always be met satisfactorily with conventional generator drive systems. The particular disadvantage in this situation is the pronounced drop in rpm of the driving internal combustion engine, which basically occurs in known systems during sudden generator upshifts. Because of this drop in rpm caused by the load, the required frequency in the case of an application as an emergency generator set can only be achieved after a time delay.

A fuel supply control method as a way of fulfilling these operating requirements is known from German Patent document DE 35 46 054 C2, in which the driving power in transient operation, namely during engine acceleration and deceleration, is influenced by regulating the amount of fuel supplied as a function of exhaust pressure. Depending on the exhaust backpressure, a correcting fuel volume is determined which is then injected, in addition to the basic fuel volume intended for steady-state operation of the motor. Although favorable fuel consumption and good exhaust characteristics are obtained with this method, corresponding to the individual operating states of the motor, the increase in rpm during transient operation, and hence the machine output power capacity, is not improved. Instead, only the fuel supply is adjusted and optimized for the momentary torque delivered by the engine.

Another method for more precisely calculating the beginning of delivery is proposed in German Patent document DE 41 13 958 A1. In the method known from that publication, the moment of injection is calculated from the engine rpm and from at least one additional operating parameter of the internal combustion engine. In order to take into account changes in rpm of the engine between the detection of the rpm and the reaching of the set position of the adjusting device, in the method described in this document the moment at which delivery begins is calculated repeatedly until the set position of the adjusting element is reached. By virtue of this repeated measurement and calculation during actuation of the regulator of the internal combustion engine, the injection time can be determined more exactly from the current values recorded at intervals, and the injection adjustment can be controlled accordingly.

Thus, a method for improving the internal efficiency of an internal combustion engine is described in this document, but the method described for adjusting the beginning of delivery proceeds in known fashion from the steady-state viewpoint in the form of an electronic device to adjust the beginning of delivery. An adjustment of the beginning of delivery, which reinforces the correction of non-steady-state motor operation when applying a load or increasing the rpm, does not take this regulating method into account.

Hence, the goal of the invention is to improve an rpm regulating method in such fashion that the power potential of a supercharged Diesel engine can be exploited to improve its loading behavior.

The present invention achieves this goal in a method for regulating the loading behavior of an internal combustion engine with one or more turbochargers, especially a Diesel engine with exhaust turbocharging as a drive for an electrical generator, in which the internal combustion engine is operated by supplying fuel as a function of at least one operating parameter, mainly in optimized steady-state operating states, corresponding to the motor requirements in each case. The internal combustion engine, starting with regulated operation, is controlled dynamically according to steady-state viewpoints in operating ranges in which motor rpm is suppressed temporarily as a function of operating parameters of the motor, with the internal combustion engine being influenced in the direction of a higher load stage.

According to the invention, therefore, a dynamic adjustment of load and engine operation for the beginning of delivery is proposed in order to optimize the indicated average pressure while utilizing the maximum admissible internal cylinder pressure limit provided by the design during load application and motor acceleration.

The method according to the invention makes use of the fact that in supercharged Diesel engines, the boost air pressure applied to the cylinders represents a critical influential parameter that affects maximum combustion pressure, with combustion pressure tending to increase with increasing boost air pressure. Another effect for which the invention is likewise specifically employed is that the combustion pressure curve in the cylinder with constant boost air pressure can be changed through the position in time of the beginning of delivery relative to the top dead center position (TDC) of the piston. In particular, an increase in the maximum pressure that can be reached by presetting the beginning of delivery can be determined. Accordingly, if a specific maximum combustion pressure must not be exceeded, at high boost-air pressures the beginning of delivery must not be set at an arbitrary interval before the ignition TDC. To the contrary, at correspondingly low boost air pressures, like those that occur during transient operation of engine acceleration, delivery can begin much earlier without the combustion-dependent internal cylinder pressure exceeding the load limit. Especially in non-steady-state operation of supercharged Diesel engines, therefore, the invention provides a temporary advance of the beginning of delivery which clearly goes beyond the limits of a steady-state shift in the moment at which delivery begins, during load application or engine acceleration, utilizing the boost air pressure that is built up with a delay by the turbocharger characteristic, and using the otherwise disadvantageous air deficiency.

With such a change in the beginning of delivery adjusted to reflect motor operation, the difference between the maximum permissible combustion pressure in the combustion chamber and the combustion pressure actually set in the combustion chamber with a conventional regulating method is utilized temporarily as an additional acceleration potential. This additionally acquired performance potential according to the invention counteracts the sag in rpm when a load is applied, and reduces the amount of sag. Consequently, the torque produced by shifting the beginning of delivery represents an additional power increase available for a short time which, together with conventional regulating methods for the exhaust turbocharger-internal combustion engine system, helps to improve the operating behavior of supercharged Diesel engines in transient operation.

The adjustment of the beginning of delivery, which depends on the load and motor operation according to the invention, thus supplements the conventional motor-regulating method during transient operation. The conventional motor regulation or conventional regulating method is retained and performed during this transient acceleration operation, just as before in steady-state operation of the supercharged motor.

By means of this standard regulation, the operating setpoint is determined primarily by the adjustment of the charge, so that once again, during transient operation, beginning at the point in time when the regulator reacts to the application of the load, the volume of fuel required to represent the operating setpoint is injected into the combustion chamber. As a result of this larger volume of fuel, considerable combustion energy is released which, among other things, leads to a gradual increase in boost air pressure. The internal cylinder pressures also increase directly with boost air pressure, however, so that the difference between the internal cylinder pressure and the maximum pressure limit decreases inversely with motor acceleration. Since, according to the invention, the known gradual increase in power is now supplemented by the briefly applicable increase in power resulting from load-dependent adjustment of the beginning of delivery, this can result in the cylinder pressure limits defined for steady-state engine operation being exceeded.

In this connection, according to the invention, either a time-limited overshoot is deliberately provided, or exceeding the permissible peak cylinder pressure is avoided, and the range between the momentary internal pressure and the internal cylinder pressure limit is utilized with the aid of a dynamic adjustment of the beginning of delivery. This dynamic adjustment of the beginning of delivery retards the respective beginning of delivery depending on the current cylinder pressure and/or the momentary boost air pressure with increasing boost air pressure. In this manner, assurance is provided that the acceleration potential of the motor that is within the given motor loading limits can be used completely to correct for the increase in load until the operating set point is reached.

For practical implementation of the method according to the invention, in three preferred embodiments of the invention the switch from motor operation without an adjustment of the beginning of delivery, or an adjustment of the beginning of delivery according to steady-state viewpoints to a regulated operation of the motor with an adjustment of the beginning of delivery in accordance with motor-dynamic viewpoints, is coupled to different shift criteria. Regardless of the choice of the shift criterion, which, when reached, results in a shift to operation with a variable setting of the beginning of delivery, in order thus temporarily to produce an increase in engine performance with whose aid a sudden load application can be compensated for more rapidly than before.

As a shift criterion that is especially simple and economical devicewise, in a preferred embodiment of the invention for generator systems, the shift takes place when the instantaneous motor rpm, starting from the respective set rpm, falls below a preset rpm value. Since an rpm signal in any case is already derived for regulation from the motor, when the motor rpm drops below the rpm limiting value setting, the beginning of delivery can be adjusted to advance the crank angle.

An especially accurate statement of the loading behavior of the motor in the form of a qualitative and quantitative operating signal can be achieved with another embodiment of the invention in which the rpm gradient is determined, starting with measured rpm signals. Depending on the sign and amount of the rpm gradient, conclusions can then be drawn about the actual degree of pressure on the motor after the load is applied. After the load is applied or the motor rpm set value is raised, with a negative rpm gradient and/or a drop below a preset rpm limiting value, the beginning of delivery is advanced. With increasingly positive rpm gradients and/or decreasing rpm deviation, the adjustment of the beginning of delivery is reduced continuously and the beginning of delivery is retarded.

In a third embodiment, a provision is made to combine the switching time until dynamic adjustment of the beginning of delivery with the disturbance value switch to the rpm set point (load-pulse-signal), known in conjunction with an early charge adjustment during application of a load and thereby trigger in advance an additional power supply from the motor, before the motor rpm drops sharply under the influence of the load that has been applied. By this preparation of the motor for the expected load, not only is a sharp drop in rpm prevented, but the entire transient regulating operation is significantly shortened until the new load stage is reached and can be corrected on a steady-state basis once again.

Particularly in motors with electronic injection control, such as for example a storage battery injection system, a switch in regulating operation, coupled to the load-pulse-signal, can be performed without any significant changes to devices using only links involving circuitry.

The variable adjustability of the beginning of delivery as a function of the actual internal cylinder pressure that occurs per combustion cycle permits optimized utilization of the entire engine acceleration potential within the internal cylinder pressure limits. According to the invention, resetting the beginning of delivery provides for a dynamic adjustment of the additional increase in power to the actual pressure conditions prevailing in the cylinder.

The reset from regulating operation with dynamically variable adjustment of the beginning of delivery to normal regulating operation takes place, in an improvement on the invention, either rigidly coupled to a time condition or linked to the operating point of a higher load stage being reached. For this purpose, the current motor characteristics, especially the boost air pressure and the internal cylinder pressure, are monitored continuously and processed accordingly in the electronic regulating device to establish the beginning of delivery.

Other objects, advantages and novel features of the present invention will become apparent from the following detailed description of the invention when considered in conjunction with the accompanying drawings.

DETAILED DESCRIPTION OF THE DRAWINGS

Figure 1:
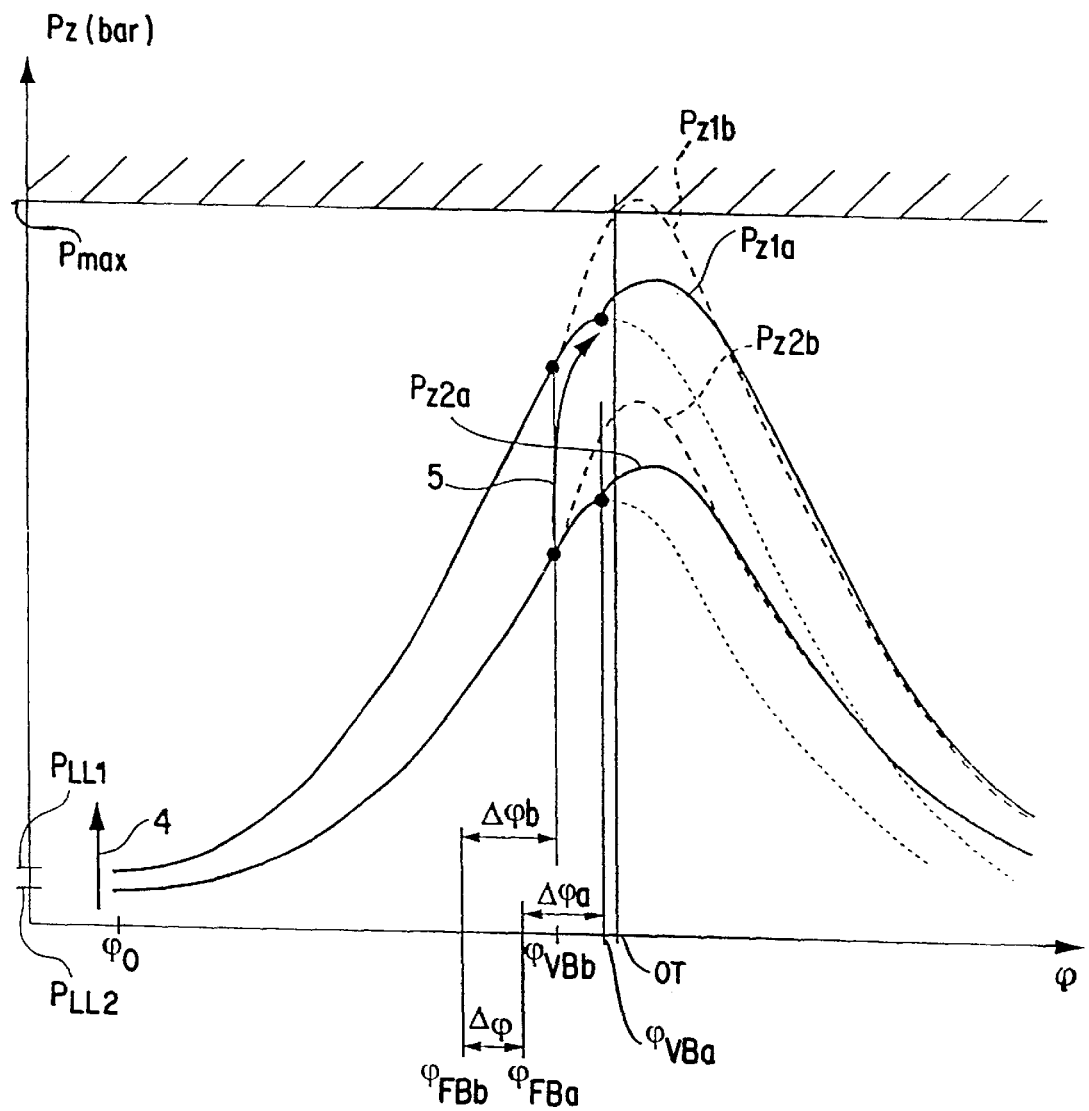
FIG. 1 shows pressure curves in the combustion chamber for two different moments of beginning of delivery.

In FIG. 1, two cylinder pressure curves $p_{z1a}$ and $p_{z2a}$ as obtained in a conventionally regulated supercharged internal combustion engine during one combustion cycle are shown. The charge and/or the injected volume of fuel is the same for pressure curves $p_{z2a}$ and $p_{z2b}$; likewise for curves $p_{z1a}$ and $p_{z1b}$. In the example of a Diesel engine shown here, with air-distributing direct injection, pressure curve $p_{z2a}$ corresponds to the pressure curves for low boost pressures, while the internal cylinder pressure that develops with correspondingly high charging pressures in the cylinder can be represented basically by curve $p_{z1a}$. Starting with these two known pressure curves $p_{z1a}$, $p_{z2a}$ in the cylinder, the theoretical influence of the moment at which delivery begins, used in the present invention, on the cylinder pressure curve is shown for example in a beginning of delivery adjusted forward for the earliest possible crank angle $\phi_{FBb}$ by comparison with the beginning of delivery $\phi_{FBa}$ set for the steady state.

In addition, the graph showing the crank angle $\phi$ plotted on the abscissa and the internal cylinder pressure $p_z$ plotted on the ordinate is limited in the direction of high internal cylinder pressures $p_z$ by the design-imposed upper limit on maximum admissible internal cylinder pressure $p_{max}$. The $p_{max}$ limit is set in the design by the mechanical load limit of the individual motor. Accordingly, at least during longer operation of the motor, damage caused by overload can occur with an increase in cylinder pressure $p_z$ above the $p_{max}$ limit. It can be assumed in FIG. 1 that, depending on the choice of the time for the beginning of delivery $\phi_{FB}$, the latter can clearly be given pressure curves characterized by the latter. Based on the cylinder pressure curves $p_{z1a}$, $p_{z2a}$ to be set under steady-state emissions-optimized regulation and hence an injection time $\phi_{FBa}$ shortly before piston top dead center (TDC), the maximum pressure reached, when the same pressure curve is viewed, increases the further the beginning of delivery is set before TDC. Together with the position of the pressure maximum, each adjustment in the beginning of delivery also has an influence on the shape of the resultant cylinder pressure curve.

Because the method according to the invention influences the combustion pressure curve during the compensation and expansion cycles, the operation of the method according to the invention for variable load- and motor-operation-dependent regulation of the beginning of delivery will be described in the following using the two internal cylinder pressure curves shown in FIG. 1 as examples.

Starting with the compensated operating state of the motor in steady state, before the load is applied, with a low boost air pressure $p_{LL2}$, the cylinder pressure curve $p_{z2a}$ appears at a low boost air pressure $p_{LL2}$ after charging is increased. In accordance with the conventional type of regulation, the gas-exchange valves close at a crank angle $\phi_O$. The cylinder charge is compressed as a result of the piston stroke, and finally reaches its maximum pressure at TDC. Shortly before TDC at a crank angle of $\phi_{VBa}$, fuel delivery begins, whereupon combustion begins in the cylinder with a certain delay in injection and ignition $\Delta\phi a$ at a crank angle $\phi_{VBa}$.

Now, if a sudden load is applied corresponding to the relationship shown in FIGS. 2 to 6, a correspondingly high power $P_L$ will be required equally suddenly from the motor. Since the exhaust turbocharger-motor system is unable at higher loads to assume the new operating set point of the motor-generator system corresponding to the load requirement without a time delay, the supercharged motor in known regulating operation is switched to the operating setpoint for the higher load stage, or accelerated. The causes and reasons for the duration of this transient operating range have been described at the outset. It should be emphasized that the duration of the transitional range depends to a critical degree on the power available for engine acceleration. More specifically, only that portion of the motor power that exceeds the demanded driving power $p_L$ is available for its acceleration. The power supply, however, is linked directly with the boost air pressure $p_{LL}$, which in turn can only be increased according to the acceleration capacity of the exhaust turbocharger.

Figure 5:
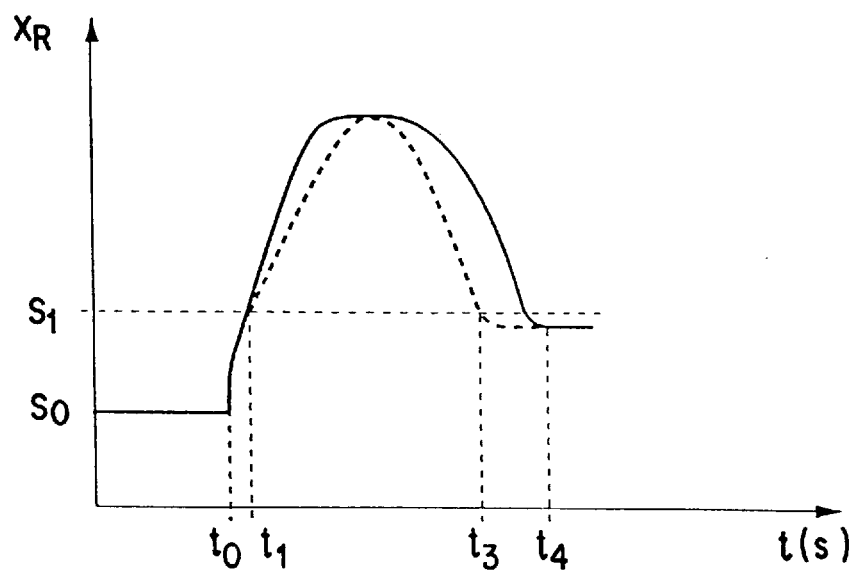
FIG. 5 shows the curves of the charge adjustment when a load is applied.

This complex interplay also takes place essentially unchanged in the method according to the invention. As is known, the fuel volume regulator responds to the drop in rpm caused by the application of the load, with charging being increased in proportion to the distance $X_R$ (FIG. 5). As a result, from the point in time when the rpm drops, a larger fuel volume that corresponds to the operating setpoint for the high load stage (S1) is delivered to the combustion chamber. The resultant slow pressure increase in the direction of arrow 4 is shown in FIG. 1, in the form of pressure curve $p_{z1a}$, which takes its departure from the higher boost air pressure $p_{LL1}$ developed after previous acceleration. Pressure curve $p_{z1a}$, like curve $p_{z2a}$, relates to the conventional regulating method; the same explanations likewise apply, apart from the higher boost air pressure $p_{LL1}$.

It is clearly evident from FIG. 1 that both the pressure maximum of curve $p_{z2a}$ and the maximum value of pressure curve $p_{z1a}$ are below the theoretically maximum possible power, the $p_{max}$ limit. It is to this that the invention is directed and, in addition to a briefly available increase in power, the invention also simultaneously produces a maximally optimal exploitation of the performance potential for accelerating the motor.

According to the invention, the conventional load-regulating method is initially obtained in order to compensate the transition of motor operation from a steady-state initial operating point to the load-related preset operating setpoint of the higher load stage. In addition, the beginning of delivery is then adjusted, primarily with the application of the load and the regulating mechanism started with it, to accelerate the motor. In FIG. 1, this shows that immediately after the load is applied at time $t_0$ in FIGS. 3 to 6, for which motor operation is characterized by pressure curve $p_{z2a}$, the beginning of delivery FB is then deliberately advanced from the previously-selected crank angle $\phi_{FBa}$ to the earliest possible beginning of delivery for the prevailing motor operating state, i.e. to crank angle $\phi_{FBb}$. In the example shown in FIGS. 1 to 6, the beginning of delivery FB is adjusted forward by a $\Delta\phi$ of 10° crank angle, for example. Basically, the amount of $\Delta\phi$ depends on the engine design.

Initiated by the adjustment of the beginning of delivery $\Delta\phi$ to $\phi_{FB2}$, combustion then begins with a system-governed injection and combustion delay after a crank angle of $\Delta\phi_b$ at time $\phi_{VBb}$. In accordance with the above-described influence together with the beginning of delivery on the combustion curve and hence on the pressure curve in the cylinder as well, the pressure curve $p_{z2b}$ is then set according to the invention. Here, one can clearly see the much earlier beginning of the pressure rise by comparison with curve $p_{z2a}$ and the additional pressure buildup $p_{z2b}$. This represents the increase in power provided according to the invention which serves to improve loading. Similarly, it permits a briefly settable increase in engine performance in operating ranges in which especially highly supercharged internal combustion engines, because of their system-governed sluggish behavior, are unable to exploit the power potential of the motor.

Under the influence of the increase in power caused by the response of the regulator and the larger volume of fuel regulated as a result, as well as the adjustment in the beginning of delivery, the motor reaches pressure level $p_{z1}$. If the beginning of delivery remains advanced, unchanged at $\phi_{FBb}$, the pressure curve shapes itself at the higher boost air pressure $p_{LL1}$ achieved with a time delay, according to the curve $p_{z1b}$ plotted in FIG. 1. The internal cylinder pressure $p_z$, regulated by the beginning of delivery, initially undesirably exceeds the peak pressure $p_{max}$ in the cylinder admissible for steady-state operation. However, since an even greater motor power for acceleration would be available as a result of such an overshoot, another version of the method according to the invention deliberately provides for a time-limited overshoot. Long-term overshoot, however, is basically undesirable.

For this purpose, internal cylinder pressure $p_z$ and/or boost air pressure $p_{LL}$ are constantly monitored and used as input parameters to limit the adjustment of the beginning of delivery. If, as in the embodiment described, an increase in cylinder pressure above the limit $p_{max}$ is to be avoided, the beginning of delivery is retarded with an increasing rise in pressure that depends on the boost air pressure after the load is applied. In FIG. 1, the wandering of the position of the pressure point marking the beginning of compression, compensated in this fashion, is plotted as curve 5 during the acceleration phase from $p_{LL2}$ to $p_{LL1}$. When boost air pressure $p_{LL1}$ has been reached, the beginning of delivery is adjusted once again to crank angle $\phi$FBa, and the permitted pressure maximum $p_{max}$ is thus maintained. This dynamic regulation of the adjustment of the beginning of delivery, adapted to transient motor operation, thus permits exploitation of the maximally available power potential of the motor. It can be used basically in all operating ranges to increase the power. The greatest effect however is achieved in the described transient acceleration operation of Diesel engines supercharged with exhaust turbochargers, since in this application the boost air deficit that exists as a result of the delayed response of the exhaust turbocharger is utilized quite deliberately to advance the beginning of delivery and increase the power yield and to optimize the power output of the exhaust-turbocharger-internal combustion engine system.

Because of this significance, using the example of an exhaust turbocharger-turbocharged generator Diesel engine, one embodiment of the method according to the invention is described in the following for improving loading behavior by switching to regulated operation with a beginning of delivery that can be adjusted depending on dynamic motor operation viewpoints, with respect to FIGS. 2–6. This motor, not shown, is equipped with motor operation regulation and an injection system, which ensure optimum adjustment of the beginning of delivery. In the graphs shown, the operating value curves obtained with the method according to the invention are shown as dashed lines and those of a conventional regulating method are shown solid. The curves are compared with one another.

Figure 2:
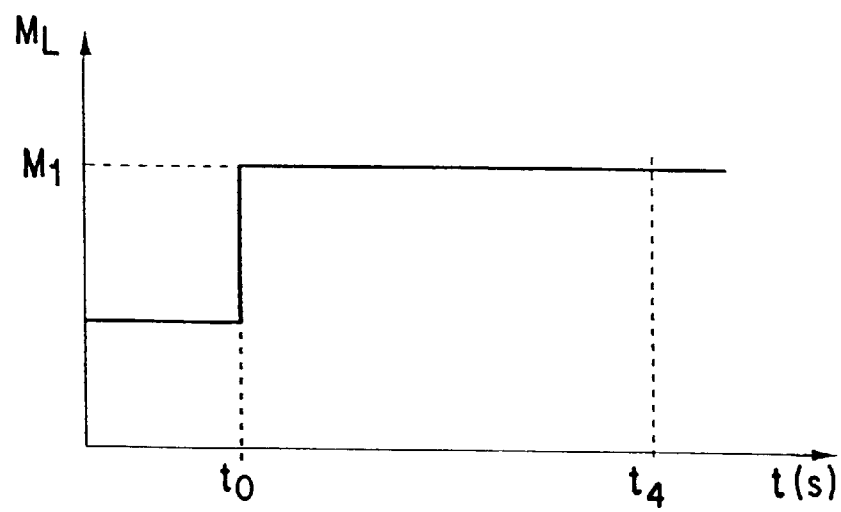
FIG. 2 shows the curve of the mechanical generator power at the coupling flange of the motor.

In FIG. 2, the curve of the load torque $M_L$ is plotted schematically as a function of time t. Beginning with zero-load motor operation, the load moment $M_L$ at time $t_0$ suddenly assumes a constant value $M_1$, which is retained for a period of time. This ideal load profile, shown in FIG. 2, roughly corresponds to the loading case when a generator is switched on, whereupon for example, an emergency generator set is connected to the drive motor operated in idle when the current from the generator fails. This is done in order to ensure a supply of power at a constant voltage and a preset current strength within the shortest possible time.

Figure 3:
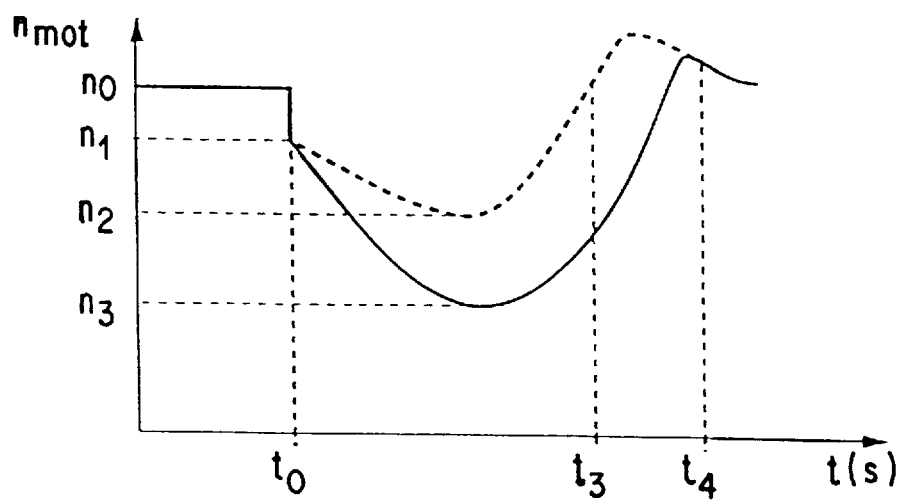
FIG. 3 shows the curves of engine rpm when a load is applied.

The effects of such a sudden power demand on the time curve of motor rpm $n_{mot}$ is shown in FIG. 3. Initially, the unloaded motor is operated at idle rpm $n_O$ until at a point in time $t_0$ the load is suddenly applied, whereupon the motor rpm is equally reduced to a lower value $n_1$. The drop in rpm is detected by suitable sensors of a regulating electronic circuit that compares the measured motor rpm value $n_{mot}$ continuously with a preset rpm limiting value $n_1$. At the same time, the change in rpm with time, in other words, the motor rpm gradient, is determined from the recorded rpm signal.

If the instantaneous rpm falls below the limiting value, which in this case is set to rpm $n_1$, a first condition is fulfilled and the last rpm gradient determined is then used as the second condition.

In addition to recording the rpm and determining the gradient, the boost air pressure, turbocharger rpm, and even the electrical power drawn by the entire system can be recorded by measuring instruments and used by the regulating device to adapt the beginning of delivery to the dynamic motor operation.

Figure 4:
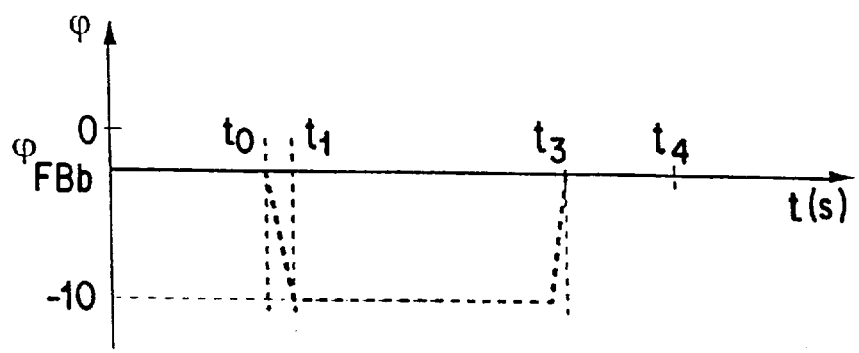
FIG. 4 shows the curves of the point when delivery begins.

Since the gradient in the present embodiment has a negative sign when the rpm limiting value $n_1$ is undershot, indicating that motor rpm would continue to fall with time, the beginning of delivery is advanced according to the invention. In FIG. 4, the crank angle curve $\phi_{FB}$ for the beginning of delivery is plotted against time on the basis of the beginning of delivery, with steady-state motor operation as a reference zero line. At time $t_0$, preadjustment of the beginning of delivery cuts in, and at time $t_1$ reaches the specified beginning of delivery at a crank angle of 10° before TDC. As soon as the beginning of delivery at time t1 has been advanced by the provided crank angle $\Delta\phi$, in this case 10° of crank angle before TDC, a combustion curve according to $p_{z2b}$ begins in the combustion chamber. The additional increase in internal cylinder pressure $p_z$ thus achieved corresponds to an increase in internal efficiency and thus results in an increase in engine torque. This increased performance, achieved according to the invention by comparison with conventional motor regulating methods, actively counteracts a further decline in rpm. Therefore, the motor rpm $n_{mot}$ falls only to an rpm value of $n_2$ (FIG. 3), which is definitely higher than the lowest rpm $n_3$ with a conventional regulating method. Consequently, the required initial rpm $n_0$ is again reached at time $t_3$, and not at time $t_4$, as is the case without a shift in the beginning of delivery.

Simultaneously with the adjustment of the beginning of delivery, a control signal is also supplied to the fuel regulator by the regulating electronic circuit as a function of engine rpm and $n_{mot}$, whereupon the quantity of fuel supplied to the combustion chamber is increased (FIG. 5). According to the invention, since the regulation of the amount of fuel that is supplied is coupled to the output torque ML as well as to the motor rpm $n_{mot}$, the required charge setting XR in the first phase of the rpm sag at $n_1$ until time $t_1$ corresponds to the charging of conventional motor regulation. Starting with a regulating distance $s_1$, the adjustment of the beginning of delivery according to the invention (dashed curve) shows its initial effect, whereupon different charge curves result.

Figure 6:
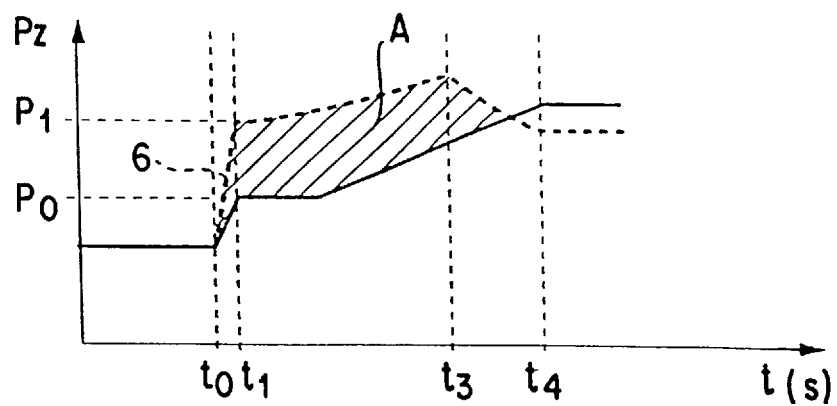
FIG. 6 shows the curve of the maximum combustion pressure during the acceleration process when a load is applied.

In FIG. 6, this temporary increase in power is illustrated using measured cylinder pressure curves $p_z$ in motors supercharged with exhaust turbochargers. In this graph, the actual cylinder pressure curve $p_z$ of a cylinder with conventional load regulation is compared by a corresponding reaction of the rpm regulator with the pressure curve (shown dashed) of the same cylinder with load compensation according to the inventive method with dynamic adjustment at the beginning of delivery. Both pressure curves are based on motor operation with identical charging and constant load moment $M_L$. The increase in power achieved according to the invention is embodied as the area A enclosed between two curves. When load compensation by means of the rpm regulator begins at time t0, because of the greater volume of fuel supplied, the internal cylinder pressure rises in known fashion in the direction of arrow 4 (FIG. 1). At the same time, according to the invention, the beginning of delivery is also advanced, whereupon the theoretically reachable higher internal cylinder pressure shown in FIG. 1 as curve $p_{z2b}$ is released. This is reflected in FIG. 6 in the form of a greater slope of pressure curve 6 and a rise to a higher pressure value $p_1$. The increase in power obtained by shifting the combustion curve from $p_{z2a}$ to $p_{z2b}$ is also superimposed on the previous power capacity of the motor as the process continues. In particular, the internal cylinder pressure reached according to the invention at time $t_3$ has already reached the value of $p_1$ that corresponds to the operating point of the higher load stage that is to be compensated.

Apart from the desired maximum possible power increase for accelerating the motor, the power potential of the motor should also be exploited safely. In order not to exceed the set load limits, even despite the adjustment in the beginning of delivery, a pressure threshold is set with which the current internal cylinder pressure is constantly compared. With increasing recovery of the system, which can be detected by an increase in the rpm gradient (positive sign) and/or exceeding the set rpm limiting value, the beginning of delivery at time $t_3$ is retarded once more, to crank angle $\phi_{FBa}$ for example. The restoration time or the restoration criterion, apart from the specified motor loading limits, can also be coupled to other current operating parameters such as the boost pressure for example. The goal is to regulate the transient power increase in such fashion as to allow the fastest possible compensation of the motor to the operating point that corresponds to the load.

With the method according to the invention for a variable beginning of delivery that is adjustable by dynamic motor operation points, the indicated average pressure can be maximized when required by utilizing the set mechanical limits. This is accomplished by virtue of the fact that the delayed increase in boost pressure, which is otherwise necessarily produced in Diesel engines supercharged with exhaust turbochargers as a result of the operating behavior of a turbocharger, can be utilized by a suitable power-increasing influence on the combustion process to produce power.

The following is a table of reference numerals used in the drawings.

Table Reference Numerals

4 Direction of pressure increase, quasi-steady-state
5 Position of beginning of combustion-pressure point
6 Increase in internal cylinder pressure with time
$p_{z1a}$ Pressure curve with FB, retarded
$p_{z2a}$ Pressure curve with FB, advanced
$p_{z1b}$ Pressure curve with beginning of delivery advanced
$p_{z2b}$ Pressure curve with beginning of delivery advanced
$p_z$ Internal cylinder pressure
$\phi$ Crank angle
$\phi_{FBb}$ Beginning of delivery, advanced
$\phi_{FBa}$ Beginning of delivery, steady-state
$p_{LL1}$ Boost air pressure
$p_{LL2}$ Boost air pressure $\phi_0$ Gas exchange valves, closed $\Delta\phi a$ Injection and ignition delay angle $\Delta\phi b$ Injection and ignition delay angle $\phi_{VBa}$ Beginning of combustion, retarded $\phi_{VBb}$ Beginning of combustion, advanced $p_{max}$ Maximum permissible internal cylinder pressure (load limit)

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for regulating the loading behavior of an internal combustion engine with at least one turbocharger, in which method the internal combustion engine is operated by supplying fuel as a function of at least one operating parameter corresponding to motor requirements, the method comprising the steps of:

beginning with a regulated operation, dynamically controlling the internal combustion engine according to steady-state viewpoints in operating ranges in which motor rpm is suppressed temporarily as a function of the at least one operating parameter; and influencing the internal combustion engine in a direction of a higher load stage;

wherein said dynamically controlling step includes the steps of:

temporarily providing an operating state with a variable beginning of delivery regulation in accordance with dynamic motor operating viewpoints; and wherein when negative deviation of a current rpm from a determinable motor rpm limiting value occurs, the beginning of delivery is temporarily adjusted toward a more advanced crank angle.

2. The method according to claim 1, further comprising the steps of:

determining an rpm gradient beginning with measured rpm signals; and temporarily advancing the beginning of delivery when the rpm gradient assumes a negative sign.

3. The method according to claim 1, wherein at the moment of loading, a signal is delivered to the fuel supply regulation, whereupon the beginning of delivery is temporarily advanced.

4. The method according to claim 1, wherein when rpm suppression of the motor begins, the beginning of delivery is advanced for a fixed period of time and, after the fixed period of time has elapsed, is adjusted to the beginning of delivery that corresponds to the steady-state operating state of a higher load stage to be compensated.

5. The method according to claim 1, wherein the beginning of delivery in the transient acceleration ranges of the engine is advanced until the internal combustion engine has reached a higher load stage to be compensated after the load has been applied.

6. The method according to claim 1, wherein the beginning of delivery is immediately set to an earliest point in time or crank angle and then, following the beginning of delivery as a function of at least one engine operating parameter in accordance with momentary motor operation viewpoints, is compensated by retarding until the engine is adjusted to the operating point for the higher load stage.

7. The method according to claim 5, wherein the operating point of the higher load stage is reached when the rpm gradient has assumed a certain positive slope and/or a preset rpm threshold has been exceeded.

8. The method according to claim 6, wherein the operating point of the higher load stage is reached when the rpm gradient has assumed a certain positive slope and/or a preset rpm threshold has been exceeded.

9. The method according to claim 6, wherein the moment of beginning of delivery is retarded as a function of the boost pressure.

* * * * *